US009672572B2

(12) United States Patent
Lehnert et al.

(10) Patent No.: US 9,672,572 B2
(45) Date of Patent: Jun. 6, 2017

(54) REAL-TIME AVAILABILITY OF OMNI-CHANNEL SALES DATA

(71) Applicants: Bernd Lehnert, Baie-d'Urfe (CA); Mark Michaud, Beaconsfield (CA); Yan Grenier, Pincourt (CA)

(72) Inventors: Bernd Lehnert, Baie-d'Urfe (CA); Mark Michaud, Beaconsfield (CA); Yan Grenier, Pincourt (CA)

(73) Assignee: SAP SE, Walldorf (DE)

( * ) Notice: Subject to any disclaimer, the term of this patent is extended or adjusted under 35 U.S.C. 154(b) by 641 days.

(21) Appl. No.: 14/218,268

(22) Filed: Mar. 18, 2014

(65) Prior Publication Data

US 2015/0269683 A1   Sep. 24, 2015

(51) Int. Cl.
*G06Q 40/00* (2012.01)
*H04L 29/06* (2006.01)
*G06Q 20/32* (2012.01)

(52) U.S. Cl.
CPC .......... *G06Q 40/12* (2013.12); *G06Q 20/322* (2013.01); *H04L 63/0209* (2013.01); *H04L 63/0442* (2013.01); *H04L 63/08* (2013.01); *H04L 63/168* (2013.01); *H04L 63/18* (2013.01)

(58) Field of Classification Search
CPC .............................. G06Q 40/00; G06Q 20/00
USPC ................................................... 705/30, 342
See application file for complete search history.

(56) References Cited

U.S. PATENT DOCUMENTS

| 8,117,298 B1* | 2/2012 | Wesinger, Jr. .... H04L 29/12009 709/223 |
| 2004/0078371 A1* | 4/2004 | Worrall ............... G06F 21/6218 |
| 2012/0179779 A1* | 7/2012 | Awasthi ............. H04L 67/1097 709/217 |
| 2013/0041931 A1* | 2/2013 | Brand ..................... H04L 67/10 709/203 |

(Continued)

OTHER PUBLICATIONS

OData Version 3.0 URL Conventions. www.Odata.org. Mar. 15, 2014. Retreived at http://web.archive.org/web/20140315234357/ http:/www.odata.org/documentation/odata-version-3-0/url-conventions.*

(Continued)

*Primary Examiner* — Scott Zare
(74) *Attorney, Agent, or Firm* — Schwegman Lundberg & Woessner, P.A.

(57) ABSTRACT

Techniques of implementing providing real-time availability of omni-channel sales data are disclosed. In some example embodiments, purchase information comprising information of purchases made by a consumer via a plurality of retail channels is received by a back-end system. The purchase information can be stored on the back-end system. A request to access the stored purchase information can be received from the consumer on a computing device. The request can comprise an identification of a virtual host and an identification of a service to invoke on the back-end system to retrieve the purchase information stored on the back-end system. An identification of an internal host can be determined based on the identification of the virtual host. The identification of the internal host can identify the back-end system. The purchase information can be retrieved from the back-end system using the identification of the internal host and the identification of the service.

16 Claims, 9 Drawing Sheets

(56) References Cited

U.S. PATENT DOCUMENTS

| | | | |
|---|---|---|---|
| 2013/0144701 A1* | 6/2013 | Kulasooriya | G06Q 20/202 705/14.24 |
| 2013/0325612 A1* | 12/2013 | Sommerville | G06Q 30/0259 705/14.57 |
| 2013/0332319 A1* | 12/2013 | Zuber | G06Q 30/0601 705/27.1 |
| 2014/0040052 A1 | 2/2014 | Arthur et al. | |
| 2014/0337815 A1* | 11/2014 | Erlewein | G06F 8/30 717/106 |
| 2014/0372367 A1* | 12/2014 | McLean | G06F 21/6218 707/603 |
| 2015/0006732 A1* | 1/2015 | Schmidt | H04L 47/726 709/226 |

OTHER PUBLICATIONS

"European Application Serial No. 15159470.2, Office Action mailed Sep. 2, 2015", 9 pgs.

* cited by examiner

REAL-TIME AVAILABILITY OF OMNI-CHANNEL SALES DATA

TECHNICAL FIELD

The present application relates generally to the technical field of data processing, and, in various example embodiments, to methods and systems of providing real-time availability of omni-channel sales data.

BACKGROUND

Currently, consumers are not provided with a consolidated view of their purchase history across different retail channels. If consumers want to find information about a previous transaction, they have to look through files for previously-saved receipts, scan e-mails for digital invoices, or even call a customer service desk to see if they can find specific sales transaction details.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
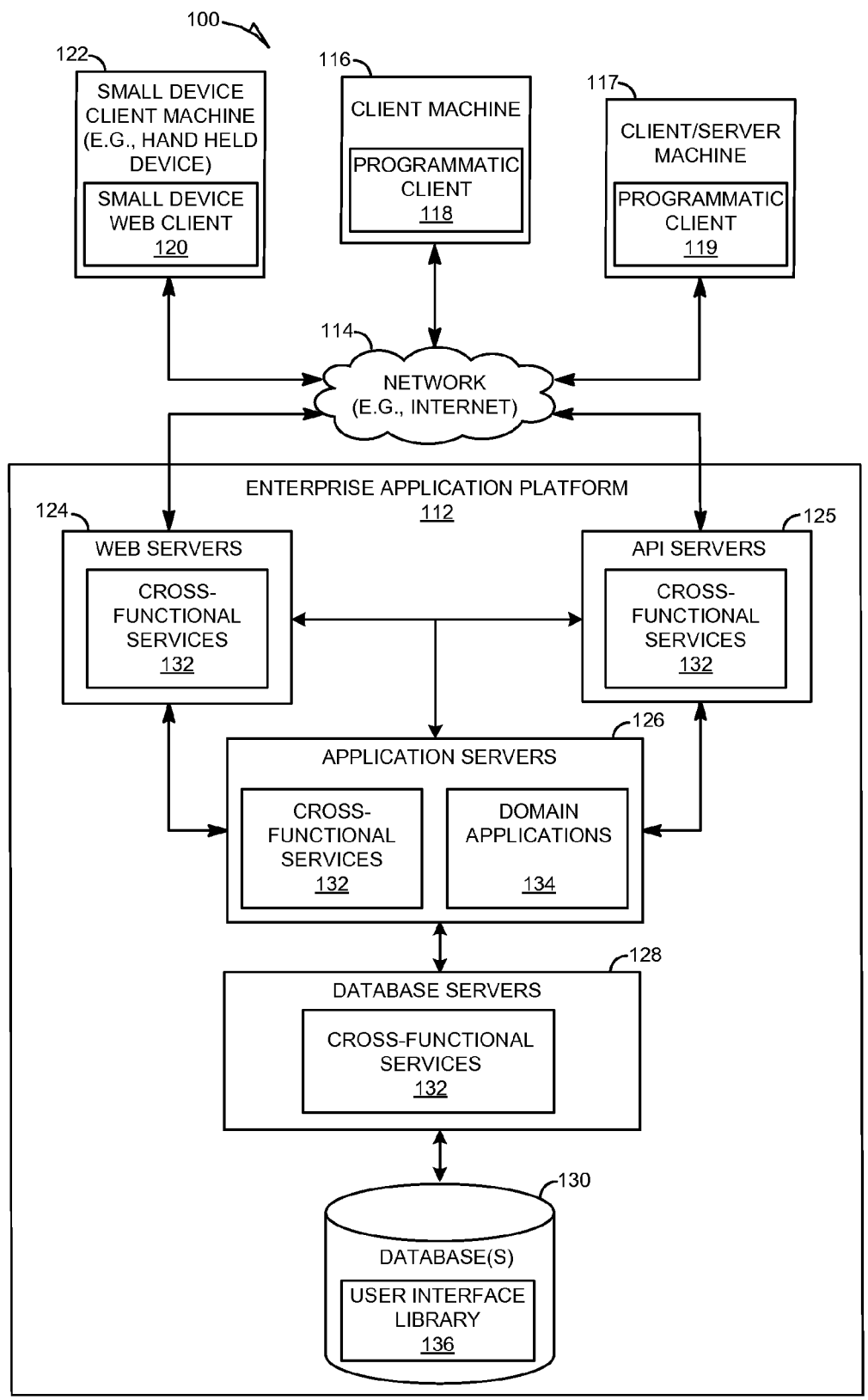
FIG. 1 is a network diagram illustrating a client-server system, in accordance with some example embodiments.

Example methods and systems providing real-time availability of omni-channel sales data are described. In the following description, for purposes of explanation, numerous specific details are set forth in order to provide a thorough understanding of example embodiments. It will be evident, however, to one skilled in the art that the present embodiments can be practiced without these specific details.

The present disclosure introduces an application that can be deployed on the cloud. The application can allow a consumer to retrieve, in real-time or near real-time, his or her purchase history using any device (e.g., a desktop computer, a laptop computer, a tablet computer, a smartphone). The purchase history can include an omni-channel history of purchases made by the consumer. Omni-channel refers to all available shopping channels (e.g., brick-and-mortar and online). The omni-channel history of purchases can comprise any purchases made via any of the available retail channels, including, but not limited to, brick-and-mortar stores and online stores. Other retail channels are also within the scope of the present disclosure. The details about the purchases made by the consumer via all of the available retail channels can be consolidated and made available to the consumer via a single cloud-based application, thereby enabling the consumer to access, using a single application, details about all of the purchases for one or more specified retailers, regardless of what retail channel was used to make the purchases. The purchase information can be made available in real-time or near real-time as the corresponding purchases are completed and/or as a back-end system of the corresponding retail entity is updated based on the corresponding purchases, where the back-end system is used to manage purchase transactions and product inventory for the retail entity. A reverse proxy employing a mapping of an identification of a virtual host to an identification of an internal host can be used to enable access to the purchase information on the back-end system, while hiding the details of the back-end system from a malicious trace.

In some example embodiments, purchase information comprising information of purchases made by a consumer via a plurality of retail channels can be received by a back-end system. The received purchase information of the consumer can be stored on the back-end system. A request to access the stored purchase information can be received from the consumer on a computing device. The request can comprise an identification of a virtual host and an identification of a service to invoke on the back-end system to retrieve the purchase information stored on the back-end system. An identification of an internal host can be determined based on the identification of the virtual host, the identification of the internal host identifying the back-end system. The purchase information can be retrieved using the identification of the internal host and the identification of the service. The retrieved purchase information can be provided to the consumer on the computing device. In some example embodiments, the plurality of retail channels comprises a brick-and-mortar retail channel and an online retail channel.

In some example embodiments, the back-end system is dedicated to a single retail entity having a central management, the single retail entity having transacted the purchases made by the consumer. In some example embodiments, the single retail entity comprises a plurality of chain stores. In some example embodiments, the back-end system is part of a private network of the single retail entity, and the back-end system is used by the single retail entity to manage purchase transactions and product inventory. In some example embodiments, the purchase information is made available for retrieval and presentation to the consumer on the computing device in real-time or near real-time with respect to the purchase information being stored on the back-end system. In some example embodiments, the purchase information is received by the back-end system in real-time or near real-time with respect to completion of the corresponding purchases.

In some example embodiments, the identification of the service comprises an identification of an Open Data Protocol (OData) service on the back-end system. In some example embodiments, the identification of the service comprises an OData Uniform Resource Locator (URL), and the purchase information is retrieved using a concatenation of the OData URL with the identification of the internal host.

In some example embodiments, purchase information of a consumer is stored. The purchase information can comprise information of purchases made by the consumer via a plurality of retail channels. The consumer can be enabled to access the purchase information via a computing device.

In some example embodiments, the plurality of retail channels comprises a brick-and-mortar retail channel and an online retail channel. In some embodiments, the purchase information is made accessible to the user on the computing device in near real-time with respect to the purchases being transacted. In some embodiments, the purchases are made across multiple retailers.

In some example embodiments, enabling the user to access the purchase information comprises receiving, from the consumer on the computing device, a request to access the purchase information, retrieving the purchase information based on the request, and causing the retrieved purchase information to be displayed on the computing device.

In some example embodiments, the purchase information is retrieved using a reverse proxy. In some embodiments, the reverse proxy receives the request. The request can comprise an identification of a virtual host and an identification of a service to invoke on a back-end system to retrieve the purchase information stored on the back-end system. The back-end system can be associated with a retailer corresponding to the purchase information. The reverse proxy can determine an identification of an internal host. The identification of the internal host can identify the back-end system. The reverse proxy can retrieve the purchase information using the identification of the internal host and the identification of the service. In some embodiments, the identification of the service comprises an identification of an Open Data Protocol (OData) service on the back-end system. In some embodiments, the identification of the service comprises an OData Uniform Resource Locator (URL) path, and the reverse proxy retrieves the purchase information using a concatenation of the OData URL with the identification of the internal host.

The methods or embodiments disclosed herein can be implemented as a computer system having one or more modules (e.g., hardware modules or software modules). Such modules can be executed by one or more processors of the computer system. In some embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser, such as the INTERNET EXPLORER browser developed by Microsoft Corporation of Redmond, Washington State), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, Application Program Interface (API) servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

Figure 2:
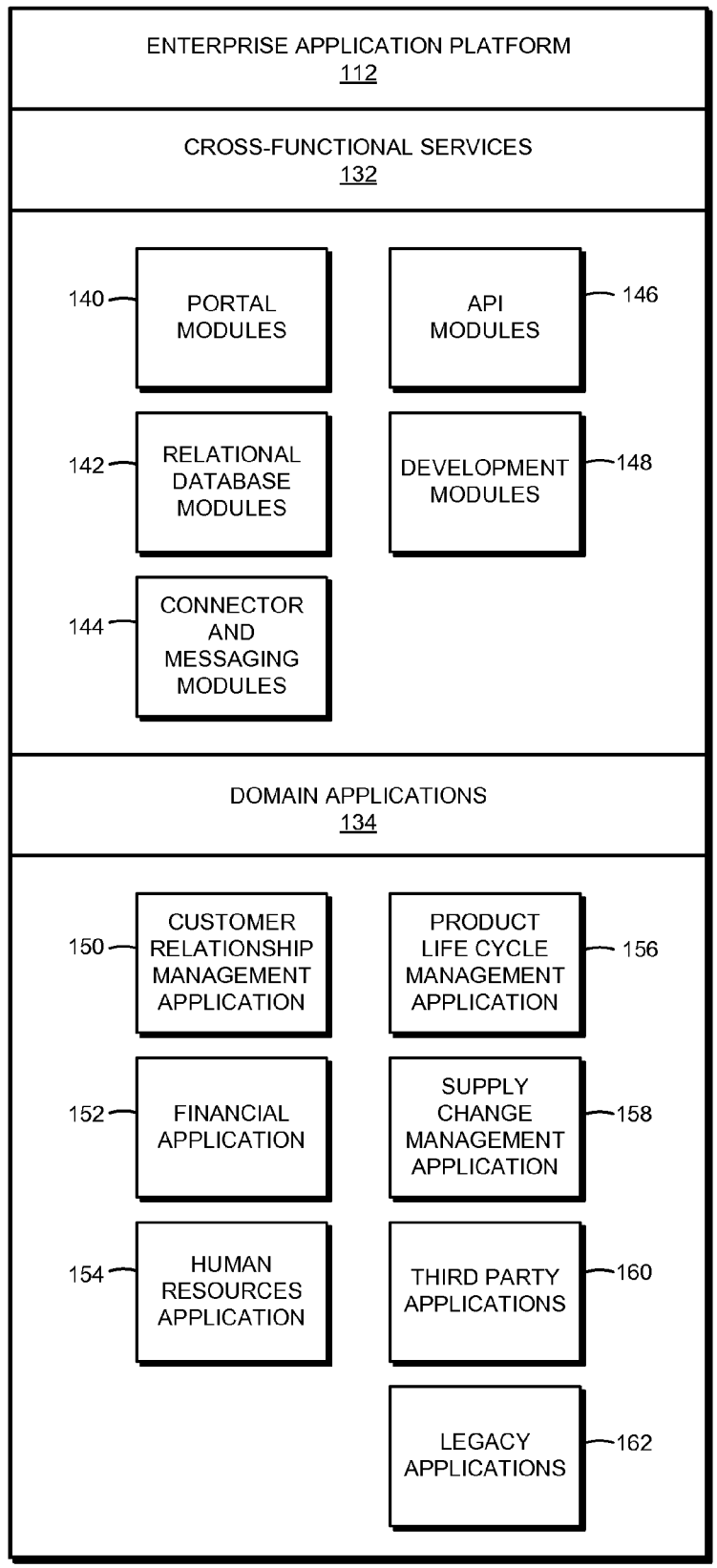
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, Application Program Interface (API) modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The Application Program Interface (API) modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
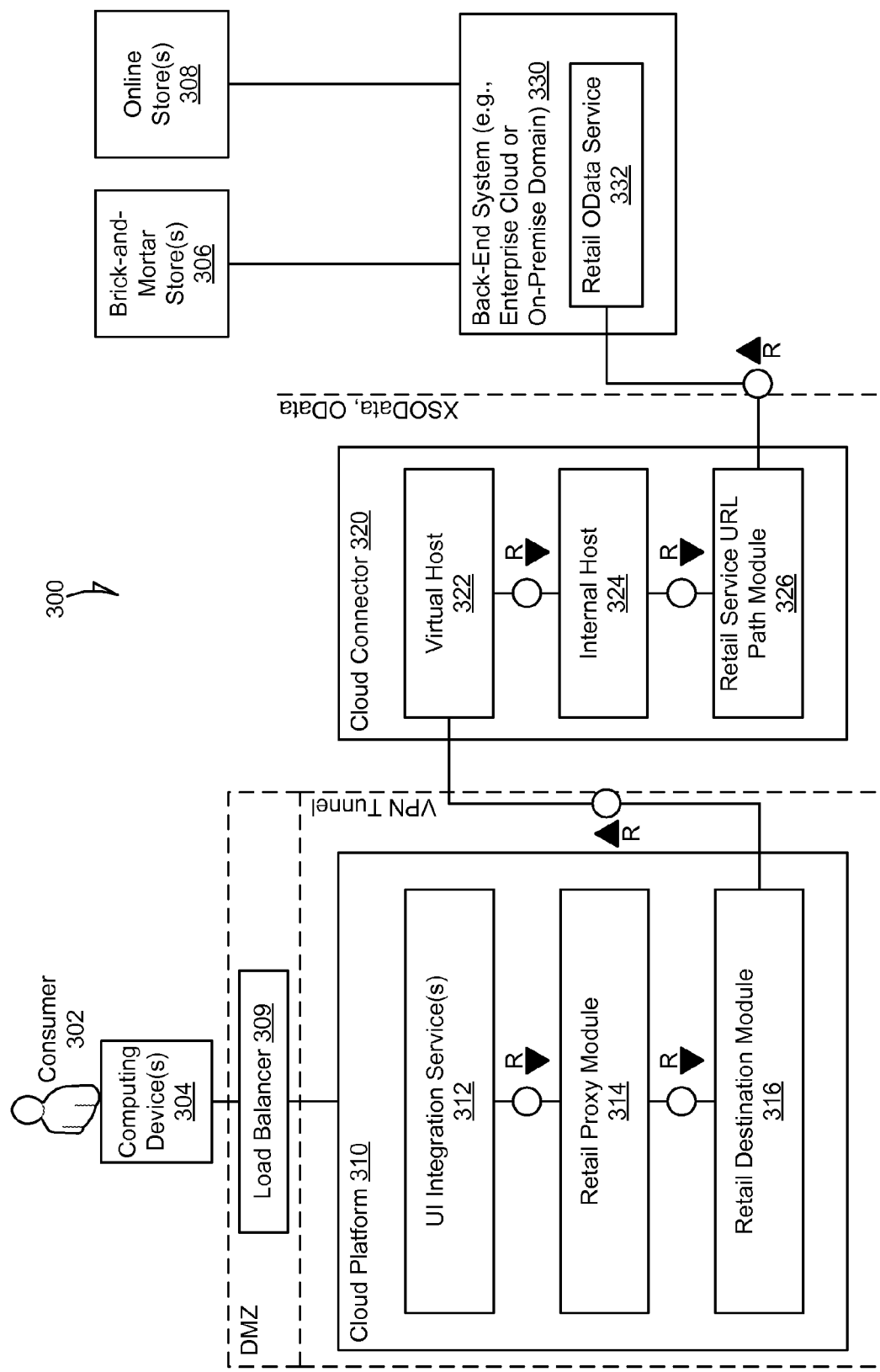
FIG. 3 is a block diagram illustrating an omni-channel purchase history system, in accordance with some example embodiments.

FIG. 3 is a block diagram illustrating an omni-channel purchase history system 300, in accordance with an example embodiment. In some embodiments, the omni-channel purchase history system 300 can comprise any combination of one or more of a cloud platform 310, a cloud connector 320, and a back-end system 330 (e.g., an enterprise cloud or an on-premise domain), which can reside on one or more machines, each having a memory and at least one processor (not shown). In some embodiments, any combination of one or more of the components of omni-channel purchase history system 300 can be incorporated into the enterprise application platform 112 in FIG. 1 (e.g., on application server(s) 126). However, it is contemplated that other configurations are also within the scope of the present disclosure. However, it is contemplated that other configurations are also within the scope of the present disclosure.

Any of the communication described herein between any of the systems, devices, modules, in-store retail channels (e.g., in-store point-of-sale terminals) or online retail channels (e.g., websites, mobile applications) can be achieved via one or more networks. The network(s) can include any network that enables communication between or among machines, databases, and devices. Accordingly, the network(s) can include a wired network, a wireless network (e.g., a mobile or cellular network), or any suitable combination thereof. The network(s) can include one or more portions that constitute a private network, a public network (e.g., the Internet), or any suitable combination thereof. Other configurations are also within the scope of the present disclosure.

Omni-channel purchase history system 300 can be used by a consumer 302 to access purchase information comprising details of purchases made by the consumer 302 via a plurality of retail channels. The consumer 302 can access this information using any computing device at any time. The plurality of retail channels can comprise all of the available retail channels for one or more retailers. In some embodiments, the retail channels comprise brick-and-mortar stores 306 and online stores 308. Retail channels within the brick-and-mortar stores 306 can include a variety of in-store point-of-sale terminals, including, but not limited to, in-store cashier terminals and in-store kiosks. Retail channels within the online stores 308 can include, but are not limited to, websites and mobile applications.

In some embodiments, as the consumer 302 makes purchases (e.g., performs transactions) using any of the available retail channels, information about those purchases is sent from the point of sale of the corresponding retail channel to a central repository (e.g., one or more in-memory databases, such as database(s) 130 in FIG. 1). The central repository can have the ability to expose this information in a particular way to consuming applications. In some embodiments, in response to (or otherwise subsequent to) a purchase being made by the consumer 302 via any of the available retail channels (e.g., at one of the retail channels within brick-and-mortar store(s) 306 and/or online store(s) 308), details of the purchase can be transmitted to the back-end system 330, where the details of the purchase can be stored. In some embodiments, the purchase information is provided by the point of sale to the back-end system 330 in either real-time or near real-time with respect to the purchases being transacted. For example, in response to the consumer 302 purchasing a product at a point of sale in a brick-and-mortar store 306, the details of the purchase can immediately be sent to the back-end system 300, where they can be accessed by the consumer 302.

In some example embodiments, the back-end system 330 is dedicated to a single retail entity having a central management. The single retail entity can have transacted the purchases made by the consumer 302. In some example embodiments, the single retail entity comprises a plurality of chain stores (e.g., all Target® stores, both brick-and-mortar and online). In some example embodiments, the back-end system 330 is part of a private network of the single retail entity, and the back-end system 330 is used by the single retail entity to manage purchase transactions and product inventory. In some example embodiments, the back-end system 330 can include enterprise resource planning (ERP) software used by the single retail entity to store and manage data from different stages of its business. These stages can include any combination of one or more of marketing and sales, inventory management, and payment and shipping. The back-end system 330 can be integrated into core business process of the single retail entity.

The back-end system 330 can be used by the single retail entity to track business resources (e.g., cash, raw materials, production capacity) and the status of business commitments (e.g., orders, purchase orders, and payroll). The back-end system can share data across the various departments of the single retail entity (e.g., manufacturing, purchasing, sales, and accounting).

In some example embodiments, the purchase information is made available for retrieval and presentation to the consumer on the computing device in real-time or near real-time with respect to the purchase information being stored on the back-end system 330. In some example embodiments, the purchase information is received by the back-end system 330 in real-time or near real-time with respect to completion of the corresponding purchases.

In some embodiments, the back-end system 330 can be dedicated to a single retailer in order to handle all the omni-channel purchase information for the single retailer. For example, in some embodiments, the back-end system 330 is configured to store all of the purchase information (e.g., all sales transactions) from all available retail channels only for a single retailer. In other embodiments, the back-end system 330 can be dedicated to multiple retailers to handle all the omni-channel purchase information across the multiple retailers. The purchase information can be in the form of a transaction log (TLOG) or a sale order. A TLOG can comprise a history of actions executed by a database management system. The purchase information can comprise sales transactions contained at the most granular level (e.g., products purchased, dates and/or times of purchases, locations of purchases, channels of purchases, promotions used or otherwise associated with purchases).

The purchase information stored in the back-end system 330 can be associated with loyalty information. The loyalty information can be used to identify the consumer who completed the transaction. The loyalty information can be captured at the point of sale. In some embodiments, the point of sale comprises the device that captures the sale, which can include, but is not limited to, a kiosk, a website, or a point of sale terminal.

Consumers can register on a web site that is hosted on the cloud platform 310. This web site can allow the consumer to view his purchase history. The web site registration can be linked to the loyalty program of the corresponding retailer. In some embodiments, the cloud platform enables only registered members to access the purchase information. Members can be consumers who have registered with the corresponding retailer via a loyalty program and have registered on the cloud platform. Registered consumers can be issued and provided with a password for using the services of the cloud platform disclosed herein. In some embodiments, the password can be generated on the cloud platform. In some embodiments, the consumer can dictate the password (e.g., enter a consumer-created password in a text field) during a registration process.

The consumer 302 can access the cloud platform 310 via the public Internet (or some other network connection) using one or more computing devices 304. In some embodiments, computing device(s) 304 can include, but is not limited to, a desktop computer, a laptop computer, a tablet computer, and a smartphone. Other types of computing devices 304 are also within the scope of the present disclosure. In some embodiments, the consumer 302 on the computing device 304 can access the cloud platform 310 through a demilitarized zone (DMZ). A DMZ is a computer or small subnetwork that sits between a trusted internal network, such as a corporate private LAN, and an untrusted external network, such as the public Internet. In some embodiments, the computing device 304 can access the cloud platform 310 through a load balancer 309 that resides inside the DMZ. In some embodiments, the back-end system 330 does not reside within a DMZ. In some embodiments, the cloud platform 310 does not reside within a DMZ. In some embodiments, the cloud platform 310 is implemented on a server residing outside of a firewall of the back-end system 330. The cloud platform 310 can be implemented as a multi-tenant Platform-as-a-Service (PaaS). The cloud platform 310 can be separated from the cloud connector 320 by a virtual private network (VPN) tunnel.

The consumer 302 can use one or more user interface (UI) integration services 312 on the cloud platform 310 to request (e.g., submit a query for) purchase information corresponding to purchases made by the consumer 302. In some embodiments, the UI integration service(s) 312 is based on a combination of HTML5, Cascading Style Sheets (CSS), and JavaScript, and is built on one or more libraries, such as jQuery. In some embodiments, the UI integration service(s) 312 comprises a UI development toolkit for HTML5 (e.g., SAPUI5). A user interface layer of the UI integration service(s) 312 can request data (e.g., purchase information) from a retail proxy module 314.

The retail proxy module 314 can be configured to overcome same-origin policy issues. A same-origin policy restricts which network messages one origin can send to another. In some embodiments, the same-origin policy permits scripts running on pages originating from the same site—a combination of scheme, hostname, and port number—to access each other's Document Object Model (DOM) with no specific restrictions, but prevents access to DOM on different sites. In some embodiments, the same-origin policy restricts how the UI integration service(s) 312 code loaded from the cloud platform 310 can interact with a resource from another origin.

The retail proxy module 314 can transfer the data request using a retail destination provided by a retail destination module 316. The retail destination module 316 can translate the query into the retail destination. The retail destination can be used for outbound communication from the cloud platform 310 to the back-end system 330 on which the requested data resides and/or from which the requested data is being retrieved. The retail destination can contain the connection details for the remote communication with the back-end system. The retail destination can be represented by a symbolic name and an identification of a virtual host, which can be used by the cloud platform 310 to securely and anonymously refer to remote connections. The symbolic name can be any identification (e.g., name) that uniquely represents the retail destination. In some embodiments, the identification of the virtual host does not reveal anything about the back-end system. For example, the identification of the virtual host can be characterized by an absence of any identification of the back-end system or its location.

The retail destination can also comprise an identification of a service that can be invoked on the back-end system to retrieve the requested data stored on the back-end system. In some embodiments, the identification of the service comprises an OData URL path, which can identify which OData service to invoke on the back-end system in order to retrieve the requested data from the back-end system. OData is a data access protocol.

In one example, a retail destination can read:
http://myapp.cloud/sap/iwbep/app1
In this example, the identification of the virtual host can be "myapp.cloud" and the identification of the service can be "sap/iwbep/app1." Other examples are also within the scope of the present disclosure.

The cloud platform 310 can transfer the data request, including the retail destination, to the cloud connector 320. Cloud connector 320 can resolve the missing information (e.g., the identification of the internal host on which the requested data resides). In some embodiments, the identification of the virtual host 322 (e.g., "myapp.cloud") is mapped into an identification of a real, concrete internal host 324 (e.g., "1dcicat.wdf.sap.corp"). The internal host can identify the actual back-end system on which the requested data resides and/or from which the requested data is being retrieved. The identification of the service (e.g., "sap/iwbep/app1") can then be concatenated to the internal host (e.g., "1dcicat.wdf.sap.corp") by a retail service URL path module 326, thereby generating a complete link (e.g., "1dcicat.wdf.sap.corp:5000/sap/iwbep/app1") for the data request.

The complete link, including the identification of the internal host and the identification of the service, can then be used to request the data from the back-end system 330. A retail service (e.g., an OData service) corresponding to the identification of the service in the complete link of the data request can be invoked to retrieve the requested data. The back-end system 330 can then provide the requested data to the cloud connector 320, which can then relay the requested data back to the cloud platform 310, where it can be caused to be displayed to the consumer 302 on the computing device 304.

The cloud connector 320 can act as a reverse proxy. By using a mapping of an identification of a virtual host to an identification of an internal host, the cloud connector 320 can enable the consumer 302 to access data on the back-end system 330, while preventing hackers, or any other ill-intentioned users attempting to perform a malicious trace, from accessing the data on the back-end system 330. The cloud connector 320 prevents anyone from accessing the data on the back-end system 330 simply by using the right username and password, as the identification of the internal host is not used, and therefore nor discoverable, within the DMZ.

Figure 4:
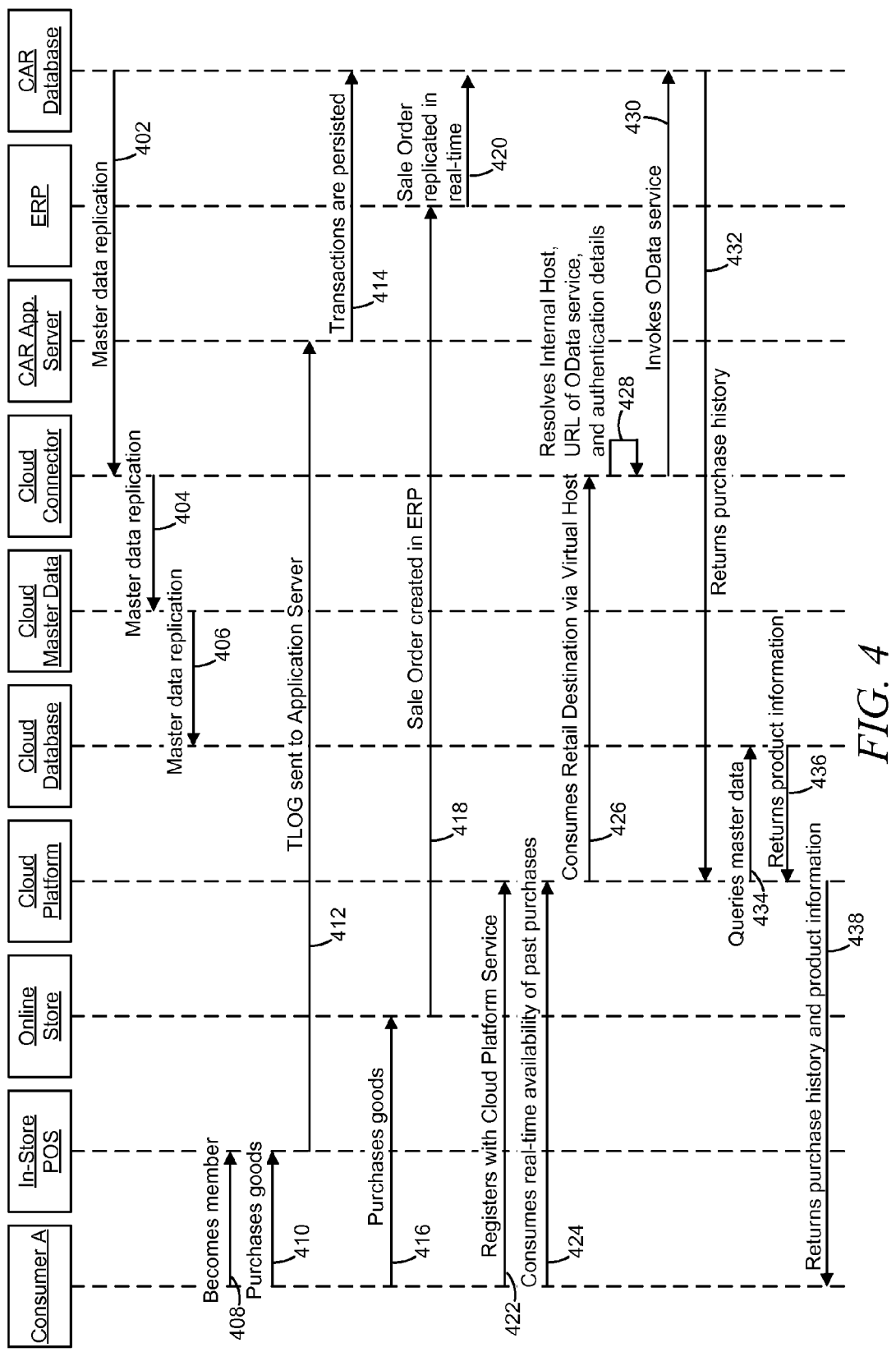
FIG. 4 is a process flow diagram illustrating data flow operations, in accordance with some example embodiments.

FIG. 4 is a process flow diagram illustrating data flow operations, in accordance with some example embodiments. The data flow operations can be performed by processing logic that can comprise hardware (e.g., circuitry, dedicated logic, programmable logic, microcode, etc.), software (e.g., instructions run on a processing device), or a combination thereof. In one implementation, the data flow operations of FIG. 4 are performed by the omni-channel purchase history system 300 of FIG. 3, or any combination of one or more of its components, as described above.

Master data (e.g., product information) can reside on a customer activity repository (CAR) database. The CAR database can reside on the cloud platform 310. In some embodiments, the master data can reside on an enterprise cloud or on an on-premise domain, depending on different factors, including, but not limited to, data privacy, data volume, data type (e.g., master data, transactional data, configuration data), data update frequency, and the systems relying on the data. Mater data fits well on the cloud platform 310 because it does not contain private user information, its volume is rather low, the data is not updated frequently, and the cloud applications often rely heavily on this information.

Through operations 402, 404, and 406, the master data can be replicated from the CAR database on the back-end system 330 to a cloud database on the cloud platform 310. This replication can be asynchronous and permanent, meaning that the applications querying the master data no longer need to communicate with the CAR database on the back-end system 330.

At operation 408, after the system is configured and master data is replicated, consumers, such as consumer A, can start registering. The first step can be completed in a physical store (e.g., brick-and-mortar store 306) using an in-store POS terminal, such as when a consumer becomes a loyalty member. This operation can be accomplished when the consumer is purchasing goods and being approached by an employee or reading information about the program.

At operation 410, the consumer can purchase goods via an in-store POS terminal. At operation 412, the in-store POS terminal can update the transaction logs on a CAR application server directly. The CAR application server can reside on the back-end system 330. At operation 414, the CAR application server can persist the data on the CAR database (e.g., following a 3-tier architecture).

In situations where goods are purchased online at operation 416, corresponding sale orders can be created directly on an enterprise resource planning (ERP) application server at operation 418. ERP application server can reside on back-end system 330 and can comprise business management software (e.g., a suite of integrated applications) that a company can use to store and manage data from every stage of business. ERP can provide an integrated real-time view of core business processes, using common databases maintained by a database management system. ERP systems track business resources (e.g., cash, raw materials, production capacity) and the status of business commitments (e.g., orders, purchase orders, and payroll). The applications that make up the system can share data across the various departments (e.g., manufacturing, purchasing, sales, accounting, etc.) that entered the data. ERP can facilitate information flow between all business functions, and can manage connections to outside stakeholders. At operation 420, in order to keep track of all retail channels, the ERP sale orders can be replicated in real-time, or near real-time, on the CAR database. As a result, both in-store purchases and online purchases can become present on the CAR database.

After purchasing goods on these different retail channels and receiving a loyalty member identification (ID), the consumer can consult his purchase history. At operation 422, the consumer can register with a corresponding service on the cloud platform 310. At operation 424, the consumer can attempt to consume the real-time availability of his or her purchase information (e.g., information about past purchases). The consumer can log on to the cloud platform service, and query one or more past purchases in real-time (or near real-time). This data consumption can refer to both in-store (brick-and-mortar) purchases and online purchases, despite the fact that they are coming from different channels.

At operation 426, the cloud platform 310 can translate the query into a retail destination, which can be used for the outbound communication of the cloud platform 310 to the back-end system 330. As previously discussed, the retail destination can contain the connection details for the remote communication with the back-end system 330. The retail destination can be represented by a symbolic name and a virtual host, which can be used by the cloud platform 310 to securely and anonymously refer to remote connections. A data request, including the retail destination, can be sent to the cloud connector 320.

At operation 428, the cloud connector can resolve the internal host at runtime based on the symbolic name and virtual host provided in the request, which can produce an object that contains customer-specific configuration details, such as an internal host, the URL of the remote system or service, the authentication type, and the relative credentials (e.g., username and password).

At operation 430, the cloud connector 430 can cause the service (e.g., an OData service) on the back-end system 330 to be invoked on the CAR database in order to obtain the requested purchase information. At operation 432, the purchase information (e.g., in the form of an OData signature containing the purchase history) can be returned to the cloud platform 310.

In some embodiments, the CAR database only returns a subset of the information requested by or relevant to the consumer. For example, in some embodiments, the CAR database returns a product ID, but not a complete description of the corresponding product. At operations 434 ad 436, this missing information can be retrieved directly from the cloud database using the master data replicated via operations 402, 404, and 406. At operation 438, the retrieved purchase information and product information can be returned to each invoking software/protocol/server layer, where it can be displayed or otherwise presented to the consumer.

It is contemplated that any of the other features described within the present disclosure can be incorporated into the data flow operations of FIG. 4.

Figure 5:
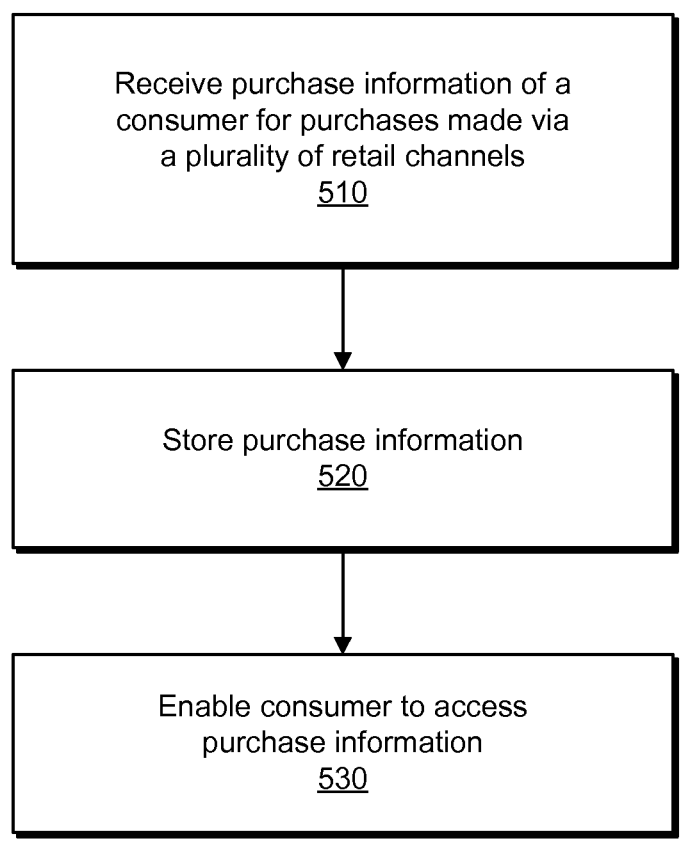
FIG. 5 is a flowchart illustrating a method, in accordance with some example embodiments.

FIG. 5 is a flowchart illustrating a method 500, in accordance with some example embodiments. Method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by the an omni-channel purchase history system 300 of FIG. 3, or any combination of one or more of its components (e.g., cloud connector 320), as described above. At operation 510, purchase information of a consumer can be received. The purchase information can comprise information about purchases made by the consumer via a plurality of retail channels. In some embodiments, the plurality of retail channels comprise a brick-and-mortar retail channel and an online retail channel. At operation 520, the purchase information can be stored in one or more databases. At operation 530, the consumer can be enabled to access the stored purchase information via a computing device. In some embodiments, the purchase information is made accessible to the user in near real-time. It is contemplated that any of the other features described within the present disclosure can be incorporated into method 500.

Figure 6:
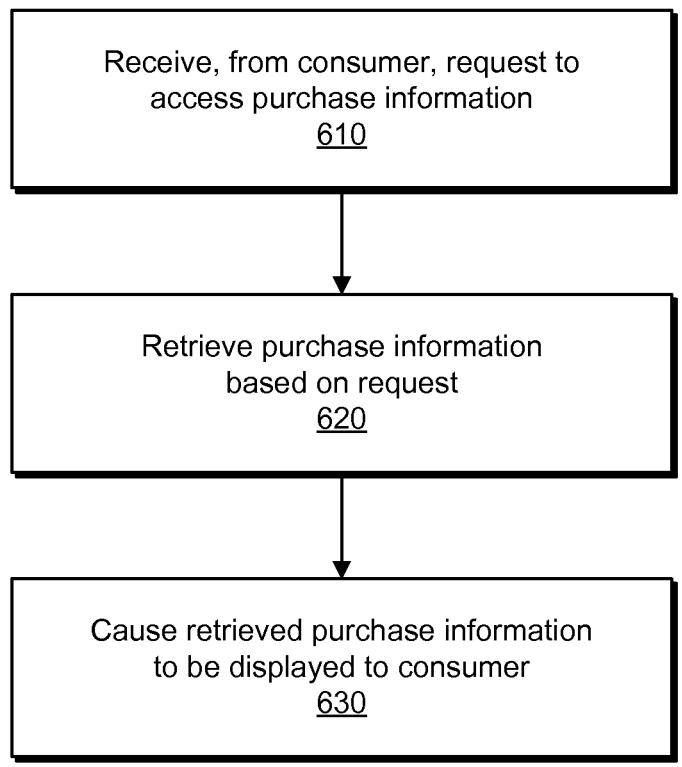
FIG. 6 is a flowchart illustrating a method, in accordance with some example embodiments.

FIG. 6 is a flowchart illustrating a method of enabling a consumer to access the stored purchase information (e.g., as mentioned above with respect to operation 530 in FIG. 5), in accordance with some example embodiments. Method 600 can be performed by processing logic that can comprise hardware (e.g., circuitry, dedicated logic, programmable logic, microcode, etc.), software (e.g., instructions run on a processing device), or a combination thereof In one implementation, the method 600 is performed by the omni-channel purchase history system 300 of FIG. 3, or any combination of one or more of its modules (e.g., cloud connector 320), as described above. At operation 610, a request to access purchase information can be received. At operation 620, the purchase information can be retrieved based on the request. At operation 630, the retrieved purchase information can be caused to be displayed to the consumer on the computing device. It is contemplated that any of the other features described within the present disclosure can be incorporated into method 600.

Figure 7:
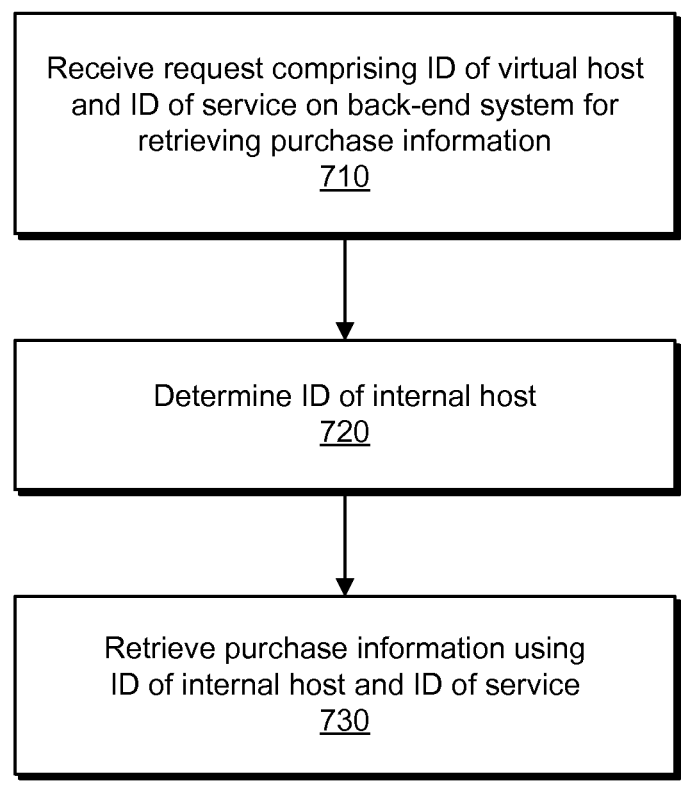
FIG. 7 is a flowchart illustrating a method, in accordance with some example embodiments.

FIG. 7 is a flowchart illustrating a method of retrieving the purchase information (e.g., as mentioned above with respect to operation 620 in FIG. 6), in accordance with some example embodiments. Method 700 can be performed by processing logic that can comprise hardware (e.g., circuitry, dedicated logic, programmable logic, microcode, etc.), software (e.g., instructions run on a processing device), or a combination thereof In one implementation, the method 700 is performed by the omni-channel purchase history system 300 of FIG. 3, or any combination of one or more of its modules (e.g., cloud connector 320), as described above. At operation 710, a request to access purchase information can be received. In some embodiments, the request comprises an identification of a virtual host and an identification of a service to invoke on a back-end system in order to retrieve the purchase information stored on the back-end system. The back-end system can be associated with a retailer corresponding to the purchase information. At operation 720, an identification of an internal host can be determined. In some embodiments, the identification of the internal host is determined based on the identification of the virtual host. At operation 730, the purchase information can be retrieved using the identification of the internal host and the identification of the service. In some embodiments, the identification of the service comprises an identification of an OData service on the back-end system. The identification of the service can comprise an OData URL path, and the purchase information can be retrieved using a concatenation of the OData URL with the identification of the internal host. It is contemplated that any of the other features described within the present disclosure can be incorporated into method 700.

In some embodiments, the techniques of the present disclosure enable a consumer to view his purchase history for one retailer from all available retail channels. There are many other use cases. In some embodiments, a consumer can retrieve his sales history for multiple retailers on any device. In some embodiments, a consumer can re-purchase items that were previously purchased. In some embodiments, in response to consumers interacting with their purchase history, promotions can be targeted to the corresponding consumers based on predictive logic and previous purchases (e.g., displaying promotions to the consumer while the consumer is viewing purchase information). In some embodiments, an ecosystem can be created to add new features and enhance the consumer experience when consumers interact with their sales history.

In some embodiments, the omni-channel purchase history system 300 can enable a consumer to find out the details of previous purchases (e.g., name of the product, make/model of purchased product, price of product, date/time of purchase, location of purchase), and then enable the consumer to perform further actions directed toward the products of the previous purchases, or their corresponding retailers, based on the details. For example, a consumer can use the omni-channel purchase history system 300 to find out the details of a purchase of a pair of pants the consumer made. The consumer can use the omni-channel purchase history system 300 to find the original purchase transaction of the pair of pants, and then find the closest store that has the same pair of pants in inventory. The consumer can then use the omni-channel purchase history system 300 to reserve the pair of pants so that it can be picked up at the store by the consumer. This query and reserve use case can be applied to any products.

In some embodiments, the consumer can gain access to his or her purchase information (e.g., sales transactions) via the following actions. The consumer can register for a loyalty program with a retailer. The registration can be handled by the retailer. During the registration process, the consumer can be explained the features, which include access to a web site where the consumer can view his or her purchase information. The consumer can accept one or more loyalty licensing agreements and complete the registration for loyalty membership. Once the consumer is a registered loyalty member, the consumer can be sent a link to the cloud application of the cloud platform 310. The consumer can then log on to the cloud application using his loyalty membership credentials or e-mail credentials. During the initial logon, the consumer can be prompted with a membership agreement, which authorizes the replication of the consumer's purchase information the cloud platform 310. Once the consumer accepts the membership agreement, the purchase information for the consumer can be replicated to the cloud application from the back-end system 330 in real-time or near real-time. In some embodiments, only registered loyalty members who have accepted the licensing agreement on the cloud application can have their purchase information replicated to the cloud application. An initial load of all purchase information can take place. Any changes to existing sales transactions by the back-end system 330 can also be replicated in real-time or near real-time. The replication can include all sales transactions for all channels for the consumer. As sales are processed and replicated into back-end system 330, they can be saved in separate tables (e.g., sales transactions completed within the stores can be stored as TLOGS and sales completed in other channels can be stored as orders. In some embodiments, the cloud application does not make the distinction between a TLOG and an order, but instead considers both as purchase history information. The extraction process from the back-end system can handle the mapping between TLOG and sales orders to purchase history information.

The following description describes how the cloud application on the cloud platform 310 can be used for purchase transactions that take place within the store (e.g., brick-and-mortar) channel. In some embodiments, the consumer makes a purchase within a physical store. In some embodiments, the consumer is not known at this point in time, so the loyalty card can be scanned so that the consumer can accumulate points for the current transaction. When the card is scanned, the consumer's membership information can be determined, from which the consumer can now be identified. At this point in time, a TLOG transaction can be created and the loyalty information can be added to the TLOG file that will be sent to the back-end system 330 at the head office. Once the purchase information (e.g., TLOG) is persisted in the back-end system 330, it can be replicated to cloud platform 310.

The following description describes how the cloud application on the cloud platform 310 can be used for sale transactions that take place within other channels besides the physical store. In some embodiment, the consumer makes a purchase at a kiosk or online. These purchases can create sales orders. At the point of order creation, the consumer can be known and identified on the order. The sales order can be created in the back-end system 330 directly. As soon as the sales order is saved or updated in an ERP, the order can be replicated to the CAR database in real-time. In some embodiments, the replication can be handled by the system landscape transformation application. All sales orders can be replicated. Once the ERP sales order for the consumer is replicated to the CAR database, a check can be done to confirm that this consumer has agreed to have his sales history replicated to the cloud platform 310. All validated orders, new or modified, can be replicated to the cloud platform 310 for members that have agreed to do so. When the consumer views his sales history on the cloud platform 310, the sales order details can now be available. In some embodiments, the sales transactions in the CAR database and ERP can be modified. As sale transactions are modified, the updated TLOG or sales orders can be reflected in the cloud platform 310. The CAR database can automatically replicate updated sales transactions to the cloud platform 310 for registered members of the cloud application.

The following description describes how consumers can query their sales history using the application on the cloud platform 310. The consumer can log onto the cloud application to view his or her transaction history. The consumer can use his or her loyalty membership ID or e-mail address to log on. The consumer can view his sales history on any computing device. The cloud application can allow the consumer to query his or her sales history by different characteristics (e.g., date, date range, product, category, location, price, price range).

The following description describes how a user can deactivate his or her membership on the cloud portal application. The cloud portal member can log on to the portal application. The consumer can then request that his membership be deactivated. A member can deactivate his or her cloud portal membership but still retain his loyalty membership. Once deactivation has been requested, all data for the cloud application can be deleted on the cloud platform 310. In some embodiments, the only data that is retained is the original document from the member, authorizing the replication of the sales history from the SAP Customer Activity Repository to the cloud platform 310, which can be retained for a corresponding legal term. Once all of the data has been deleted, an e-mail can be sent to the member. A copy of the e-mail can be stored in the back-end system 330. The e-mail can be deleted once an appropriate legal timeframe has elapsed.

Example Mobile Device

Figure 8:
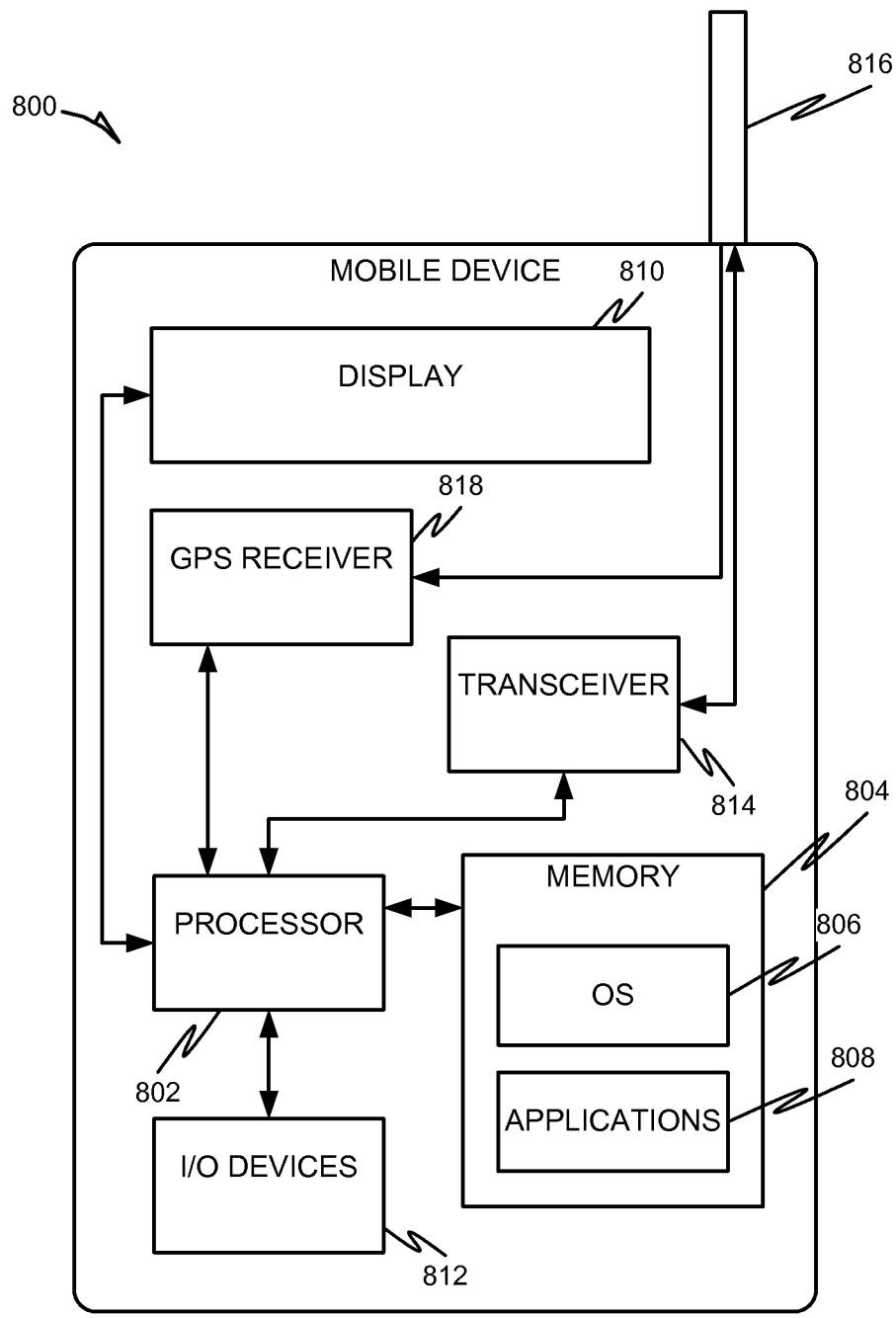
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location enabled application that can provide LBSs to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 9:
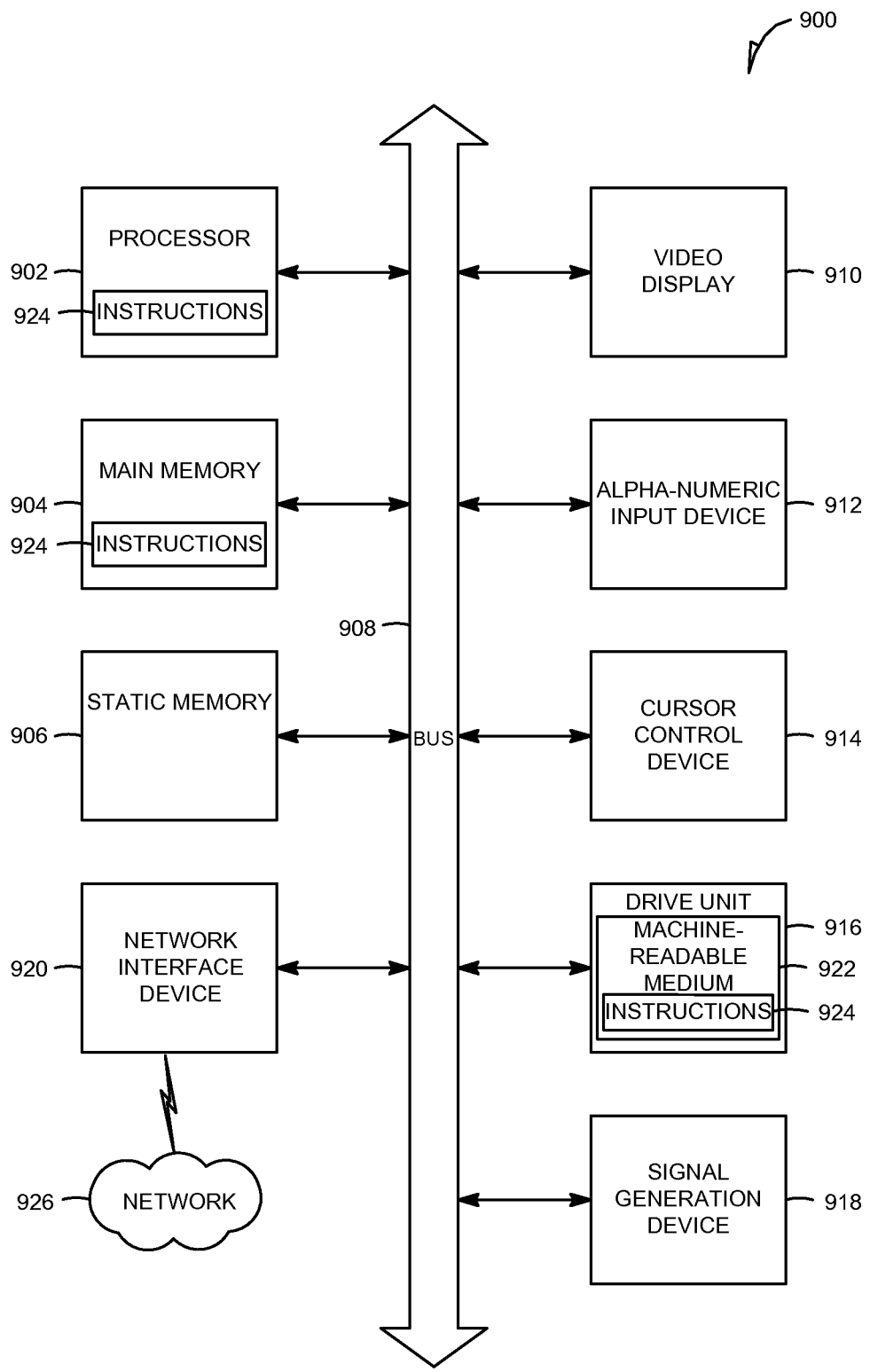
FIG. 9 is a block diagram of an example computer system on which methodologies described herein can be executed, in accordance with some example embodiments.

FIG. 9 is a block diagram of a machine in the example form of a computer system 900 within which instructions 924 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 can further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, the main memory 904 and the processor 902 also constituting machine-readable media. The instructions 924 can also reside, completely or at least partially, within the static memory 906.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 can further be transmitted or received over a communications network 926 using a transmission medium. The instructions 924 can be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving, by a back-end system, purchase information comprising information of purchases made by a consumer via a plurality of retail channels;
storing the received purchase information of the consumer in a database on the back-end system;
receiving, from the consumer on a computing device, a request to access the stored purchase information, the request comprising an identification of a virtual host and an identification of a service to invoke on the back-end system to retrieve the purchase information stored on the back-end system, the identification of the service comprising an OData Uniform Resource Locator (URL) that identifies an Open Data Protocol (OData) service on the back-end system;
determining, by a machine having a memory and at least one processor, an identification of an internal host based on the identification of the virtual host, the identification of the internal host identifying the back-end system;

retrieving, from the database, the purchase information using the identification of the internal host and the identification of the service, the purchase information being retrieved using a concatenation of the OData URL with the identification of the internal host; and providing the retrieved purchase information to the consumer on the computing device.

2. The method of claim 1, wherein the plurality of retail channels comprises a brick-and-mortar retail channel and an online retail channel.

3. The method of claim 1, wherein the back-end system is dedicated to a single retail entity having a central management, the single retail entity having transacted the purchases made by the consumer.

4. The method of claim 3, wherein the single retail entity comprises a plurality of chain stores.

5. The method of claim 3, wherein the back-end system is part of a private network of the single retail entity, and the back-end system is used by the single retail entity to manage purchase transactions and product inventory.

6. The method of claim 5, wherein the purchase information is made available for retrieval and presentation to the consumer on the computing device in real-time or near real-time with respect to the purchase information being stored on the back-end system.

7. The method of claim 1, wherein the purchase information is received by the back-end system in real-time or near real-time with respect to completion of the corresponding purchases.

8. A system comprising:
a machine having a memory and at least one processor; and
aback-end system configured to:
receive purchase information comprising information of purchases made by a consumer via a plurality of retail channels; and
store the received purchase information of the consumer in a database on the back-end system; and
a cloud connector on the machine configured to:
receive, from the consumer on a computing device, a request to access the stored purchase information, the request comprising an identification of a virtual host and an identification of a service to invoke on the back-end system to retrieve the purchase information stored on the back-end system, the identification of the service comprising an OData Uniform Resource Locator (URL) that identifies an Open Data Protocol (OData) service on the back-end system;
determine an identification of an internal host based on the identification of the virtual host, the identification of the internal host identifying the back-end system; and
retrieve, from the database, the purchase information from the back-end system using the identification of the internal host and the identification of the service, the purchase information being retrieved using a concatenation of the OData URL with the identification of the internal host.

9. The system of claim 8, wherein the plurality of retail channels comprises a brick-and-mortar retail channel and an online retail channel.

10. The system of claim 8, wherein the back-end system is dedicated to a single retail entity having a central management, the single retail entity having transacted the purchases made by the consumer.

11. The system of claim 10, wherein the single retail entity comprises a plurality of chain stores.

12. The system of claim 10, wherein the back-end system is part of a private network of the single retail entity, and the back-end system is used by the single retail entity to manage purchase transactions and product inventory.

13. The system of claim 12, wherein the purchase information is made available by the back-end system for retrieval and presentation to the consumer on the computing device in real-time or near real-time with respect to the purchase information being stored on the back-end system.

14. The system of claim 8, wherein the back-end system is further configured to receive the purchase information in real-time or near real-time with respect to completion of the corresponding purchases.

15. A non-transitory machine-readable storage medium, tangibly embodying a set of instructions that, when executed by at least one processor, causes the at least one processor to perform a set of operations comprising:
receiving, by a back-end system, purchase information comprising information of purchases made by a consumer via a plurality of retail channels;
storing the received purchase information of the consumer in a database on the back-end system;
receiving, from the consumer on a computing device, a request to access the stored purchase information, the request comprising an identification of a virtual host and an identification of a service to invoke on the back-end system to retrieve the purchase information stored on the back-end system, the identification of the service comprising an OData Uniform Resource Locator (URL) that identifies an Open Data Protocol (OData) service on the back-end system;
determining an identification of an internal host based on the identification of the virtual host, the identification of the internal host identifying the back-end system; and
retrieving, from the database, the purchase information using the identification of the internal host and the identification of the service, the purchase information being retrieved using a concatenation of the OData URL with the identification of the internal host; and
providing the retrieved purchase information to the consumer on the computing device.

16. The non-transitory machine-readable storage medium of claim 15, wherein the plurality of retail channels comprises a brick-and-mortar retail channel and an online retail channel.

* * * * *